United States Patent
Kim

(10) Patent No.: US 8,051,657 B2
(45) Date of Patent: Nov. 8, 2011

(54) PLUNGER-TYPED MASTER CYLINDER FOR BRAKE SYSTEM OF VEHICLE

(75) Inventor: Seonghun Kim, Gyeonggi-do (KR)

(73) Assignee: Hyundai Mobis Co., Ltd., Seoul (KR)

( * ) Notice: Subject to any disclaimer, the term of this patent is extended or adjusted under 35 U.S.C. 154(b) by 622 days.

(21) Appl. No.: 12/190,734

(22) Filed: Aug. 13, 2008

(65) Prior Publication Data

US 2009/0049982 A1    Feb. 26, 2009

(30) Foreign Application Priority Data

Aug. 20, 2007   (KR) .................. 10-2007-0083425

(51) Int. Cl.
*B60T 11/20* (2006.01)
*B60T 11/236* (2006.01)
(52) U.S. Cl. .................................... 60/588; 60/585
(58) Field of Classification Search ................ 60/562, 60/585, 588
See application file for complete search history.

(56) References Cited

U.S. PATENT DOCUMENTS

| | | |
|---|---|---|
| 7,104,059 B2 | 9/2006 | Tsubouchi et al. |
| 7,181,911 B2 | 2/2007 | Ishikawa et al. |
| 2004/0013549 A1 | 1/2004 | Ahn |
| 2005/0103582 A1 | 5/2005 | Lim |
| 2008/0121473 A1 | 5/2008 | Kang |
| 2008/0216473 A1 | 9/2008 | Kim |
| 2008/0289330 A1* | 11/2008 | Gaffe et al. ............ 60/588 |

* cited by examiner

*Primary Examiner* — Thomas E Lazo
(74) *Attorney, Agent, or Firm* — Greenblum & Bernstein, P.L.C.

(57) ABSTRACT

According to the plunger-typed master cylinder of the invention, because deformation of seal cups fitted in the hydraulic pressure chambers with the pistons (primary piston and floating piston) inserted is minimized, that is, the deformation of the inner flange being in contact with pistons does not substantially affect the outer flange being in contact with hydraulic pressure chambers when the master cylinder is in operation, it is possible to prevent deterioration in the performance of passing or stopping oil due to the deformation of seal cups and durability.

7 Claims, 2 Drawing Sheets

(a)

(b)

SECTION A-A (c)

PLUNGER-TYPED MASTER CYLINDER FOR BRAKE SYSTEM OF VEHICLE

CROSS-REFERENCE TO RELATED APPLICATIONS

The present application is based on, and claims priority from, Korean Application Serial Number 10-2007-0083425, filed on Aug. 20, 2007, the disclosure of which is hereby incorporated by reference herein in its entirety.

FIELD OF THE INVENTION

The present invention relates to a master cylinder, particularly a plunger-typed master cylinder for a brake system of a vehicle in which oil is smoothly supplied and of which the durability is improved.

BACKGROUND OF THE INVENTION

In general, a brake system of a vehicle is operated to slow down or stop the vehicle that is in travel.

Brake systems are largely classified into a hydraulic brake that brakes a vehicle using hydraulic pressure generated by operating a brake pedal, a hydraulic servo brake that is designed to be used for vehicles requiring a large brake force, such as large-sized vehicles, and an air brake that brakes a vehicle using pressure of compressed air.

In the hydraulic brake system, a master cylinder generates hydraulic pressure using a booster that increases the operational force of the brake pedal and supplies the pressure to a caliper on the wheel or a wheel cylinder in the drum, and this operation is very important, that is, the performance of the master cylinder is the main factor to determine the performance of the brake system.

A plunger-typed master cylinder of master cylinders in the related art includes a primary piston that receives a force from a booster increasing a stepping force applied on the brake pedal and a floating piston that is disposed in the cylinder and actuated by the force transmitted to the primary piston, in which hydraulic pressure is generated by the primary piston and the floating piston in the master cylinder, respectively.

The plunger-typed master cylinder is commonly provided with seal cups with the inner circumferences being in contact with the primary piston and the floating piston and the outer circumferences with the insides of a hydraulic pressure chambers to generate hydraulic pressure, such that the seal cups function as oil passages while the brake is not in operation or the stepping force is released and stop the oil flow in braking.

However, the contact conditions of the inner and outer circumferences of the seal cups inserted in the hydraulic pressure chambers in the master cylinder are different, that is, the inner circumferences of the seal cups are deformed because it is in contact with the pistons that move in operation of the master cylinder, whereas the outer circumferences are kept in contact with the insides of the hydraulic pressure chambers, such that deformation is different at the inner and outer circumferences. Therefore, when the difference in deformation of the seal cups is excessive, it may reduce the durability due to increase in the contact areas, in addition to reducing the oil supply passage.

SUMMARY OF THE INVENTION

Embodiments of the present invention help overcome the drawbacks of master cylinders in the related art reduce problems due to deformation of seal cups by minimizing influence of deformation of inner circumferences that are in contact with pistons (primary piston and floating piston) on outer circumferences that are in contact with hydraulic pressure chambers when a master cylinder is in operation, in which the seal cups are inserted in the hydraulic pressure chambers of the master cylinder.

A plunger-typed master cylinder for brake system of vehicle according to an embodiment of the invention includes a cylinder body, a piston assembly, and seal cups. The cylinder body has hydraulic pressure chambers where brake oil is supplied from an oil reservoir. The piston assembly is composed of a pair of primary piston and floating piston that is each elastically supported by a spring in the hydraulic chambers, and supplies hydraulic pressure to a brake when a booster is in operation. Each of the seal cups is composed of a pair of floating cup and primary cup that is spaced apart from each other on the primary piston and the floating piston. The outer circumferences of the primary and floating cups are in contact with the insides of the hydraulic pressure chambers and the inner circumferences are in contact with the primary piston and the floating piston, respectively. Each of the primary and floating cups has a deformation reference portion recessed on a side of a body having outer and inner circumferences, close to the outer circumference, to prevent deformation of the inner circumference from being transmitted to the outer circumference.

Further, the primary cup has a ring-shaped body, an outer flange extends and inclines upward from a side of the body, and an inner flange extends and declines from the side of the body at a predetermined distance from the outer flange. Furthermore a deformation reference portion is formed on a deformation reference line (a) corresponding to the thickness of the outer flange, on the opposite side of the body to the side from which the outer flange and the inner flange extend.

Further, the primary cup has reinforcement ribs that protrude from the inner flange and extend from the inner flange to outer flange to increase the thickness of the inner flange, at regular intervals between the outer flange and the inner flange.

Further, oil passages that are oil supply channels are formed at regular intervals around the body of the primary cup such that they do not overlap the reinforcement ribs on the opposite side of the body.

According to the embodiments of the invention, since the thicknesses of the inner and outer circumferences of the seal cups, which form oil passages or stop oil flow in non-braking or braking in the hydraulic pressure chambers of the master cylinder, are different, it is possible to reduce problems caused by deformation of the outer circumferences due to deformation of the inner circumferences by contact of the pistons moving.

Further, according to the embodiments of the invention, since the thicknesses of the inner and outer circumferences of the seal cups in the hydraulic pressure chambers of the master cylinder are different, it is possible to maintain the durability and reduce field claim due to deterioration of the durability by reducing the contact areas of the inner circumferences of the seal cups with the pistons.

BRIEF DESCRIPTION OF THE DRAWINGS

For better understanding of the nature and objects of the present invention, reference should be made to the following detailed description with the accompanying drawings, in which.

DETAILED DESCRIPTION OF THE PREFERRED EMBODIMENTS

Hereinafter, embodiments of the invention are described in detail with the accompanying drawings, the embodiments are disclosed for illustrative purposes and those skilled in the art will appreciate that various modifications, additions and substitutions are possible. Therefore, the invention is not limited thereto.

Figure 1:
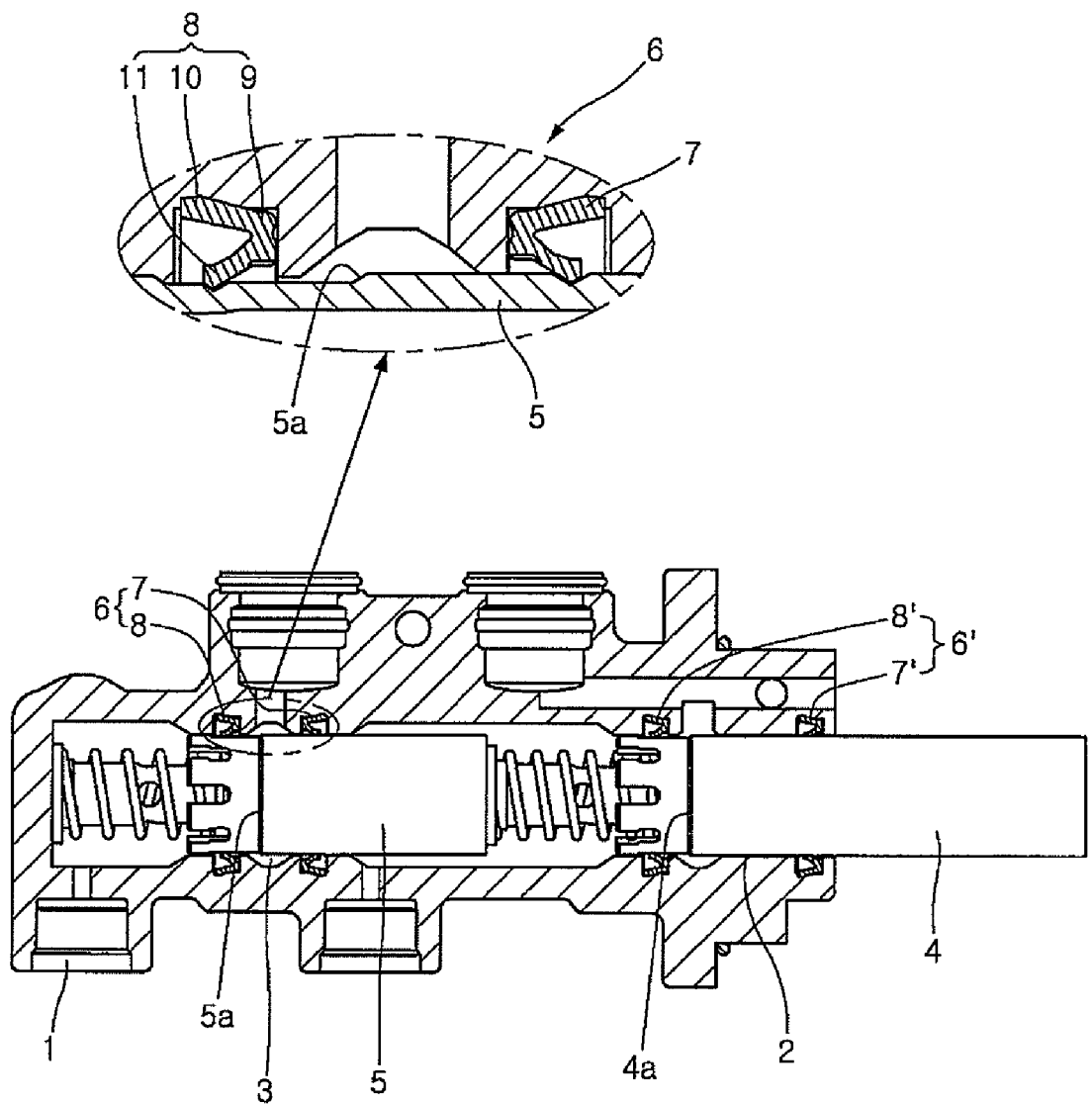
FIG. 1 is a view illustrating the configuration of a plunger-typed master cylinder for a brake system of a vehicle according to an embodiment of the invention.

Referring to FIG. 1 illustrating the configuration of a plunger-typed master cylinder for a brake system of a vehicle, a master cylinder according to an embodiment of the invention includes: a cylinder body 1 that has hydraulic pressure chambers 2, 3 where brake oil is supplied from an oil reservoir; a piston assembly that is composed of a pair of primary piston 4 and floating piston 5 that is disposed in hydraulic pressure chambers 2, 3, respectively, and supplies hydraulic pressure to a brake while being actuated by pressure from a booster; and a pair of seal cups 6 of which the outer circumferences are in contact with hydraulic pressure chambers 2, 3 and the inner circumferences are in contact with primary and floating pistons 4, 5 and that functions as an oil passage or stops the oil flow in operation.

Further, primary piston 4 and the floating piston 5 are elastically supported by springs in hydraulic pressure chambers 2, 3.

Further, the seal cups 6, 6' are composed of a pair of floating cups 7, 7' made of an elastic material and primary cups 8, 8', respectively, such that the outer circumferences are in contact with hydraulic pressure chambers 2, 3 and the inner circumferences are in contact with primary piston 4 and the floating piston 5, respectively.

Floating cup 7' and primary cup 8' of seal cup 6' on primary piston 4 are disposed at a predetermined distance from each other and primary cup 8' is disposed on a stepped portion 4a at a predetermine distance from floating cup 7' of primary piston 4.

Further, seal cup 6 on floating piston 5 has the same configuration, that is, floating cup 7 and primary cup 8 are disposed at a predetermined distance from each other and primary cup 8 is disposed on a stepped portion 5a at a predetermined distance from floating cup 7 of floating piston 5.

Primary cups 8, 8' with the inner circumferences on stepped portions 4a, 5a of primary and floating pistons 4, 5 are designed to considerably reduce the influence on the outer circumferences by deformation of the inner circumferences that are in contact with primary and floating pistons 4, 5.

Figure 2:
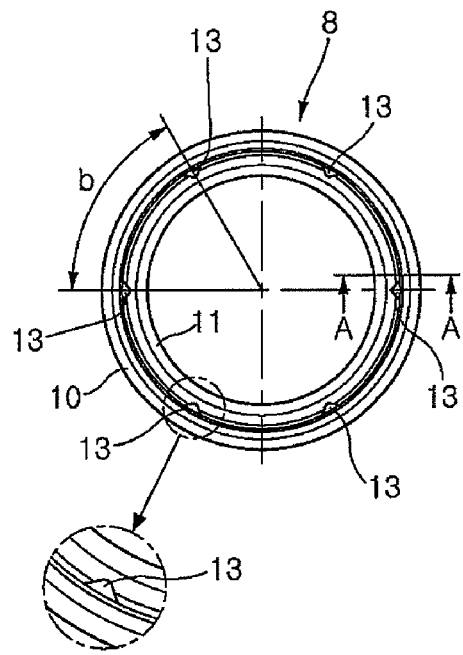
FIGS. 2A to 2C are views illustrating the configuration of a seal cup according to an embodiment of the invention.
Figure 2:
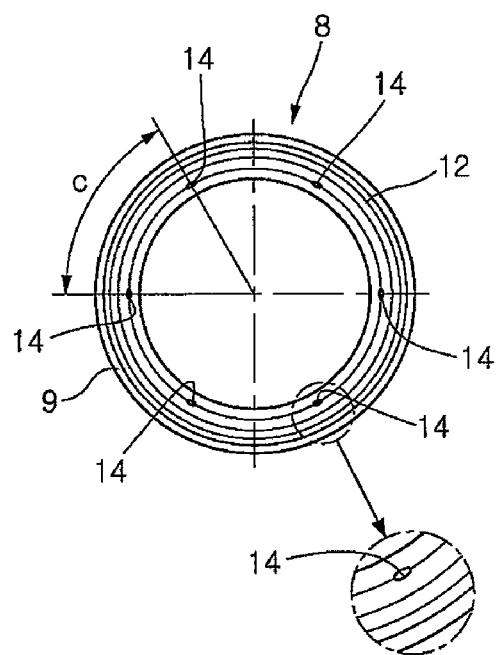
Figure 2:
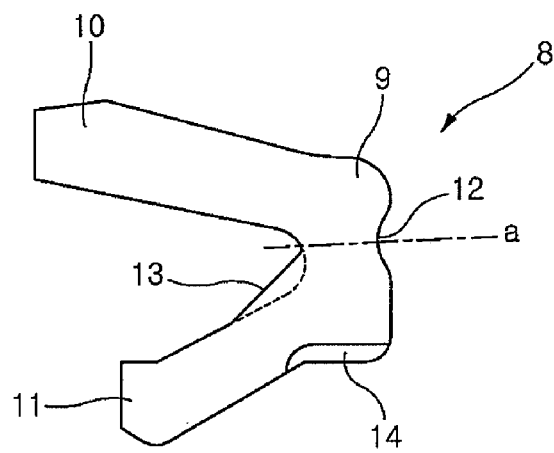

As shown in FIGS. 2A to 2C, primary cups 8, 8' each have a entirely ring-shaped body 9, an outer flange 10 extends and inclines upward from a side of body 9, and an inner flange 11 extends and declines from the side of body 9 at a predetermined distance from outer flange 10.

The cross section formed by outer flange 10 and inner flange 11 is '>' shape, but outer flange 10 and inner flange 11 are connected to body 9 in an arc shape. Further, in the cross section, outer flange 10 and inner flange 11 are spaced apart such that they do not contact with each other even though the distance between them is decreased by deformation in hydraulic pressure chambers 2, 3.

Further, primary cups 8, 8' each have a deformation reference portion 12 that is recessed on the opposite side of body 9 to the side from which outer flange 10 and inner flange 11 extend, in order to reduce the deformation transmitted to outer flange 10, restricting the deformation to inner flange 11, when the deformation of inner flange 11 is transmitted to outer flange 10.

Deformation reference portion 12 is formed on a deformation reference line (a) corresponding to the thickness of outer flange 10.

Further, in primary cups 8, 8', reinforcement ribs 13 are formed between outer flanges 10 and inner flanges 11, extending from inner flange 11 to outer flange 10 to increase the thickness of inner flange 11.

Reinforcement rib 13 extends to the inside of outer flange 10 of body 9, thereby forming deformation reference portion 12.

Reinforcement ribs 13 are formed at regular intervals around body 9, preferably at distribution angles (b) of 60°.

Further, oil passages 14 that are channels for supplying the oil are formed along the circumference of the body 9 and connected to a portion of inner flange 11 across the width of body 9.

Oil passages 14 are formed at regular intervals in body 9, preferably at distribution angles (c) of 60°.

Further, oil passages 14 are formed between distribution angles (b) of reinforcement ribs 13 such that they do not overlap reinforcement ribs 13 on the opposite side of body 9.

The operation of a plunge-typed master cylinder according to an embodiment of the invention is described hereafter with reference to the accompanying drawings.

According to plunger-typed master cylinder of an embodiment of the invention, because deformation of seal cups 6, 6' fitted in hydraulic pressure chambers 2, 3 with the pistons (primary piston 4 and floating piston 5) inserted is minimized, that is, the deformation of inner flange 11 being in contact with pistons 4, 5 does not substantially affect outer flange 10 being in contact with hydraulic pressure chambers 2, 3 when the master cylinder is in operation, it is possible to prevent deterioration in the performance of passing or stopping oil due to the deformation of seal cups 6, 6' and durability.

The smooth oil flow and prevention of deterioration of the durability of the master cylinder is made by seal cups 6, 6' fitted in hydraulic pressure chambers 2, 3 with primary piston 4 and floating piston 5 inserted, that is, because primary cups 8, 8' on stepped portions 4a, 5a of pistons 4, 5, respectively, have flexibility against deformation and form oil passages 14 for the oil flow.

This is achieved from the configuration of primary cups 8, 8' fitted on stepped portions 4, 5 at predetermined distances from floating cups 7, 7' of seal cups 6, 6' while floating cups 7, 7' are fitted on primary piston 4 and floating piston 5, as shown in FIG. 1.

That is, as shown in FIGS. 2A to 2C, when primary cups 8, 8' are fitted on primary and floating pistons 4, 5, inner flanges 11 that are in contact with stepped portions 4a, 5a are spaced apart from outer flanges 10 that are in contact with hydraulic pressure chambers 2, 3, and deformation reference portion 12 is formed on body 9 from which inner and outer flanges 11, 10 extend, to reduce the deformation transmitted from inner flange 11 to outer flange 10.

Since deformation reference portions 12 are formed on bodies 9 from which inner and outer flanges 11, 10 of primary cups 8, 8' extend, while the master cylinder operates, the deformation of inner flanges 11 does not substantially affect outer flanges 10, even though inner flanges 11 that are fitted on primary and floating pistons 4, 5 and in contact with stepped portions 4a, 5a are largely deformed and the outer flanges 10 that are in contact with hydraulic pressure chambers 2, 3 does not substantially deform.

In detail, the deformation is blocked at deformation reference line (a) where deformation reference portion 12 of body 9 is formed, that is, deformation reference portion 12 formed on deformation reference line (a) lowers the center of deformation of primary cups 8, 8' to inner flange 11 before outer flange 10 is deformed by the deformation transmitted from inner flange 11.

Further, reinforcement ribs 13 formed between inner and outer flanges 11, 10 of primary cups 8, 8' stop the deformation of inner flanges 11 from being transmitted to outer flange 10, which is because reinforcement ribs 13 extend from inner flanges 11 toward outer flanges 10 to deformation reference portions 12.

That is, as the thickness of inner flanges 11 is increased by reinforcement ribs 13 and reinforcement ribs 13 are disposed at regular intervals, even though contact friction forces of primary and floating pistons 4, 5 are applied to inner flanges 11 when the master cylinder is in operation, inner flanges 11 are not largely deformed because the thickness of inner flanges 11 are increased by reinforcement ribs 13.

As described above, when the master cylinder is in operation, the large deformation of inner flanges 11 of primary cups 8, 8' is not transmitted to outer flanges 10, that is, the deformation of inner flanges 11 is reduced by reinforcement ribs 13 between inner and outer flanges 11, 10 and the center of the deformation is lowered to inner flanges 11 by deformation reference portions 12 formed on bodies 9 from which inner and outer flanges 11, 10 extend, such that it is possible to reduce difference in deformation between inner and outer flanges 11, 10 of primary cups 8, 8'.

Further, since primary cups 8, 8' has oil passages 14 formed around body 9 to supply oil, when the master cylinder is in operation, even though the deformation or contact areas of inner flanges 11 that are in contact with the primary and floating pistons 4, 5, oil passages 14 maintain the space for oil flow between the primary and floating pistons 4, 5, such that it is possible to maintain smooth supply of brake oil.

What is claimed is:

1. A plunger-typed master cylinder for brake system of vehicle, comprising:
    a cylinder body that has hydraulic pressure chambers where brake oil is supplied from an oil reservoir;
    a piston assembly comprising a pair of a primary piston and a floating piston that is each elastically supported by a spring in the hydraulic chambers and supplies hydraulic pressure to a brake when a booster is in operation; and
    seal cups comprising a pair of a floating cup and a primary cup that are spaced apart from each other on the primary piston and the floating piston, the outer circumferences of the seal cups are in contact with the insides of the hydraulic pressure chambers and the inner circumferences of the seal cups are in contact with the primary piston and the floating piston, respectively, and each seal cup has a deformation reference portion comprising a recess on a side of a body having outer and inner circumferences, closer to the outer circumference than to the inner circumference, to prevent deformation of the inner circumference from being transmitted to the outer circumference,
    wherein the primary cup has a ring-shaped body, an outer flange extends and inclines upward from a side of the body, an inner flange extends and declines from the side of the body at a predetermined distance from the outer flange, and the deformation reference portion is provided on a deformation reference line corresponding to the thickness of the outer flange, on the opposite side of the body to the side from which the outer flange and the inner flange extend.

2. The plunger-typed master cylinder as defined in claim 1, wherein the primary cup further has reinforcement ribs that protrude from the inner flange and extend from the inner flange to outer flange to increase the thickness of the inner flange, between the outer flange and the inner flange.

3. The plunger-typed master cylinder as defined in claim 2, wherein the reinforcement ribs extend to the inside of the outer flange of the body.

4. The plunger-typed master cylinder as defined in claim 2, wherein the reinforcement ribs are disposed at regular intervals around the body.

5. The plunger-typed master cylinder as defined in claim 1, wherein oil passages that are oil supply channels are further provided around the body of the primary cup.

6. The plunger-typed master cylinder as defined in claim 5, wherein the oil passage extends to a portion of the inner flange across the width of the body.

7. The plunger-typed master cylinder as defined in claim 5, wherein the oil passages are disposed at regular intervals around the body and do not overlap reinforcement ribs on the opposite side of the body.

* * * * *